United States Patent [19]

Newington et al.

[11] 3,961,195

[45] June 1, 1976

[54] FIRE DETECTOR HAVING MEANS FOR HEATING THE SUPPORT MEMBER OF AN ELECTRODE TO PREVENT FORMATION OF MOISTURE THEREON

[76] Inventors: Timothy John Newington, 70 Greenfield Road, Greenside, Johannesburg, Transvaal; Nicolaas Tjaart van der Walt, 33 Thomas St., Meredale, Johannesburg, Transvaal, both of South Africa

[22] Filed: Dec. 10, 1974

[21] Appl. No.: 531,346

[30] Foreign Application Priority Data

Aug. 26, 1974 South Africa ........................ 74/5354

[52] U.S. Cl. ................................................ 250/385

[51] Int. Cl.² .......................................... G01N 23/12

[58] Field of Search ........... 250/381, 382, 384, 385, 250/389; 340/237 S; 219/209

[56] References Cited

UNITED STATES PATENTS

| | | | |
|---|---|---|---|
| 1,099,365 | 6/1914 | Henderson | 219/209 |
| 2,660,656 | 11/1953 | Wilkie | 219/209 |
| 3,733,596 | 5/1973 | Arima | 250/389 X |
| 3,767,917 | 10/1973 | Lampart et al. | 250/385 X |

*Primary Examiner*—Davis L. Willis
*Attorney, Agent, or Firm*—Haseltine, Lake & Waters

[57] ABSTRACT

A fire detector comprising a housing defining an ionization chamber and an electrode supported in the housing by means of a support member made of an insulating material. In order to prevent leakage currents flowing between the electrode and the housing a portion of the support member between the electrode and the housing is heated. The formation of moisture on that portion is thus prevented.

2 Claims, 1 Drawing Figure

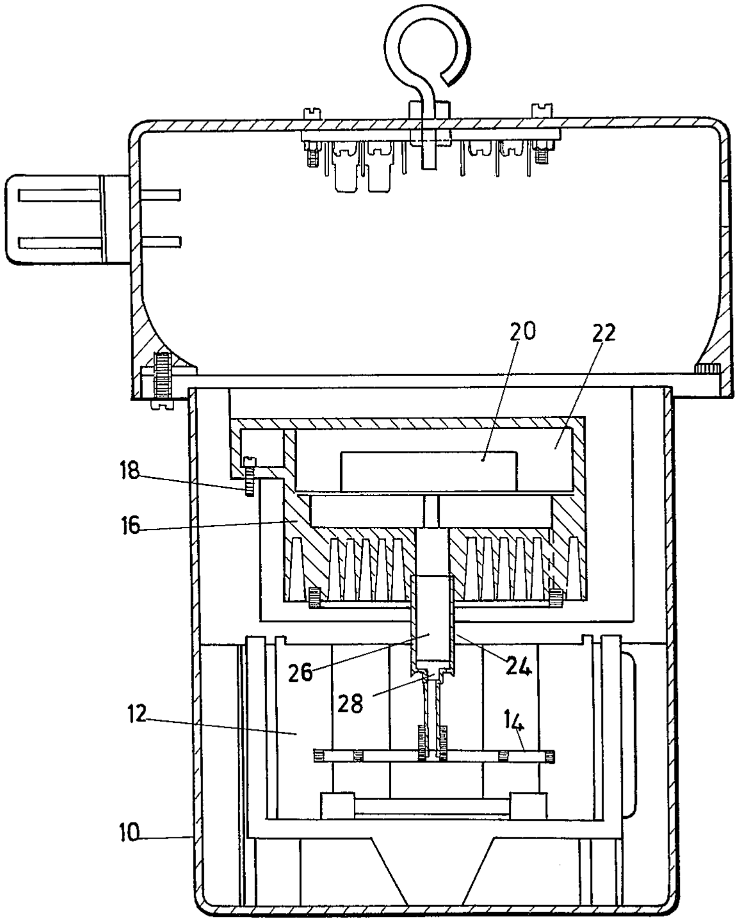
20
22
18
16
26
24
28
12
14
10

FIRE DETECTOR HAVING MEANS FOR HEATING THE SUPPORT MEMBER OF AN ELECTRODE TO PREVENT FORMATION OF MOISTURE THEREON

This invention relates to fire detectors of the type used in mines and similar installations for detecting the outbreak of a fire.

Such detectors generally comprise a housing defining a cavity known as an ionization chamber, an electrode supported in the ionization chamber by means of a support member made of an insulating material, and an electronic circuit to apply a voltage between the housing and the electrode and to detect variations in the resulting electrical current flowing through the ionization chamber. Usually, the electrical current flowing through the ionization chamber is substantially constant when no combustion particles are present. On the outbreak of a fire, however, the resulting combustion particles cause a decrease in the magnitude of the current. This decrease is detected and an alarm or the like is energized.

Under certain conditions, such as those encountered in mines, moisture and dust can accumulate on the surface of the support member. This can cause small leakage currents to flow between the electrode and the housing which, in turn, can seriously affect the operation of the detector. In this regard it should be pointed out that the current flowing through the ionization chamber is usually very small e.g. of the order of 500 pico-amps.

It is an object of the present invention to provide a fire detector in which the problem of leakage currents caused by the accumulation of moisture on the support member is overcome.

A fire detector according to the invention includes means to heat at least a portion of the support member between the electrode and the housing to prevent the formation of moisture thereon thereby to prevent leakage currents flowing between the electrode and the housing via the support member.

Further according to the invention the heating means comprises a heat generating component of the electronic circuit.

Further according to the invention the heat generating component is an operational amplifier.

Further according to the invention the heat generating component is mounted in a suitable cavity formed in the support member between the electrode and the housing.

To illustrate the invention an embodiment thereof is described hereunder with reference to the accompanying drawing the sole FIGURE of which is a sectional side elevation view of the fire detector of the invention.

With reference to the drawing the fire detector comprises, in essence, a housing 10 defining an ionization chamber 12 having suitable openings therein through which smoke can pass. An electrical grid 14 is supported in the ionization chamber by means of a supporting structure 16 which is secured to one inner wall of the housing 10 at 18.

The usual electronic circuit for detecting variations in the currents flowing through the ionization chamber is located in a container 20 which is mounted in a cavity 22 in the supporting structure 16.

The supporting structure 16 includes a vertical limb 24, the electrical grid 14 being attached to the lower end of the limb.

A cavity is formed in the limb 24, and one of the heat transmitting components of the electronic circuit is located in this cavity. The component in question is preferably an operational amplifier 28 which is of course connected into the circuit located in the container 20. The heat generated by the operational amplifier will prevent the formation of moisture on that part of the limb 24 surrounding the operational amplifier and this, in turn, will minimize the possibility of leakage currents flowing between the grid and the housing via the supporting structure 16.

Experiments have shown that approximately 50 milliwatts of heat power applied to the inner surface of the limb 24 over a length of approximately 5 mm will cause a temperature rise on the outer surface of that part of the limb of about 5 degrees C, and this seems to be sufficient to keep that part of the leakage current path dry under extreme humidity conditions. By suitable choice of an operational amplifier it is possible to obtain one with a quiescent power consumption (in the form of heat) of 45 milliwatts.

It would of course also be possible to use a separate heater to keep the limb 24 dry but this would mean that extra heater current would be required.

We claim:

1. In a fire detector having a housing defining an ionization chamber, a support member of an electrically insulating material, an electrode supported in the ionization chamber by said support member and an electronic circuit to apply a voltage between the housing and the electrode and to detect variations in the resulting electrical current flowing through the ionization chamber, an improvement comprising a heat generating component of the electronic circuit, means mounting said heat generating component in a cavity formed in the support member between the electrode and the housing to heat that part of the support member surrounding the component in order to prevent the formation of moisture on that part thereby to prevent leakage currents flowing between the electrode and the housing via the support member.

2. A fire detector as claimed in claim 1 wherein said heat generating component is an operational amplifier.

* * * * *